United States Patent Office 3,474,706
Patented Oct. 28, 1969

3,474,706
PROCESS FOR MAKING A TEXTURED
SURFACE PANEL
Robert G. Wheeler, Corvallis, Oreg., assignor to Wood
Processes, Oregon Ltd., Corvallis, Oreg., a partnership
of Oregon
Filed Feb. 14, 1968, Ser. No. 705,537
Int. Cl. B23d 1/18, 1/20
U.S. Cl. 90—24                                    2 Claims

ABSTRACT OF THE DISCLOSURE

A decorative metal panel, which may be used either as a structural member or as an embossing plate in the manufacture of decorative boards, is produced by the process of rigidly securing a metal plate onto the bed of a planer, slightly dulling the cutting edge of a relatively wide planer tool and then therewith removing a layer of metal from the upper surface of the plate. The layer of metal removed is relatively thick and due to the dullness of the planer tool, the metal is scraped with a rough, tearing action, producing a jagged, textural surface across the upper side of the plate.

Background of the invention

It is desired to produce a rough, textural surface upon structural building panels, either of metal, or fibrous mat surfaced plywood, particle board, or other composite board products. Panels of one or more of these types have occasionally been provided with a striated surface produced by a multiplicity of grooves smoothly cut, machined or embossed into one face thereof. The alternate grooves are of random width and depth but each groove is of the same width and depth throughout the entire length of the caul plate. It is not possible by conventional machining operations as heretofore employed in the manufacture of panels or embossing caul plates to produce a surface which is of irregular pattern in all directions across the surface of the plate.

Summary of the invention

In accordance with the present invention, a decorative metal panel which may be used either as a structural member or as an embossing plate in manufacturing decorative panel boards is prepared by rough machining the upper surface thereof in a planer mill. A sheet of a suitable metal is first rigidly secured to the bed of a planer. The cutting edge of a wide planer tool is first sharpened across its entire width and thereafter it is dulled slightly so that it will not cut metal in accordance with standard machining practice as the tool is moved relatively across the upper surface of the plate. Instead, relatively deep cuts are made across the top of the plate and due to the dullness of the cutting edge of the tool, a layer of metal is more or less scraped or torn from the upper plate surface. Successive passes of the cutting tool are overlapped so that the continuous rough, jagged, textural surface is produced across the upper side of the plate over an area at least as great as the textured surface which is to be produced on the panel board.

It is an object of the present invention therefore to provide a new and improved process for producing a textured surface panel by removing a layer of metal from the upper surface of a metal plate with a relatively dull, wide cutting tool so as to produce a rough, jagged, textural surface upon one side of the plate.

Description of the preferred embodiments

Figure 1:
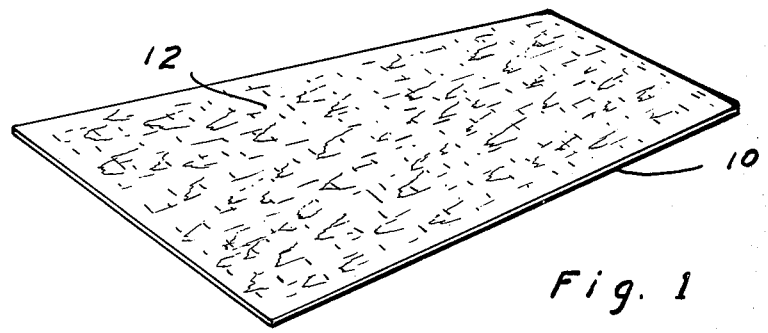
FIG. 1 is a perspective view illustrating a panel provided with a textured surface produced in accordance with the process of the present invention.

The present invention is concerned primarily with the process for producing a textured metal panel which may be used either as a decorative structural element, or as an embossing plate in the manufacture of composite structural building panels. FIG. 1 illustrates a panel 10 which may be a sheet of metal, plywood, particle board, or any other form of composite board, as desired. In the case of a composite board, it is preferably provided with a fibrous pulp sheet layer on at least one side, such as is further described in Patents No. 2,947,654, No. 2,992,152 and No. 3,011,-938, all issued to Ralph Chapman and all relating to various processes for forming composite board products. The upper surface 12 of the panel 10 is provided with a textured surface, a typical small sample of which is clearly illustrated in the enlarged photographic reproduction of FIG. 2. The metal panel may be used as a decorative structural element or as an embossing plate for surfacing other panels. Such a textured surface may be reproduced on other composite panels by placing a wet blanket or web of loosely felted, interlaced, cellulosic fibers or pulp upon an embossing plate provided with a textured upper surface coextensive with the area of the upper surface 12 of the panel 10. The remaining components of the panel are then assembled on top of the blanket or web, together with a suitable adhesive, and the assembled unit is then placed in a hot press and cured under heat and pressure. The pattern from the embossing plate is thereby imparted to the blanket or web which is transformed into a thin fibrous coating upon the board surface and which at the same time is adhesively secured and consolidated as an integral part of the panel itself.

Figure 3:
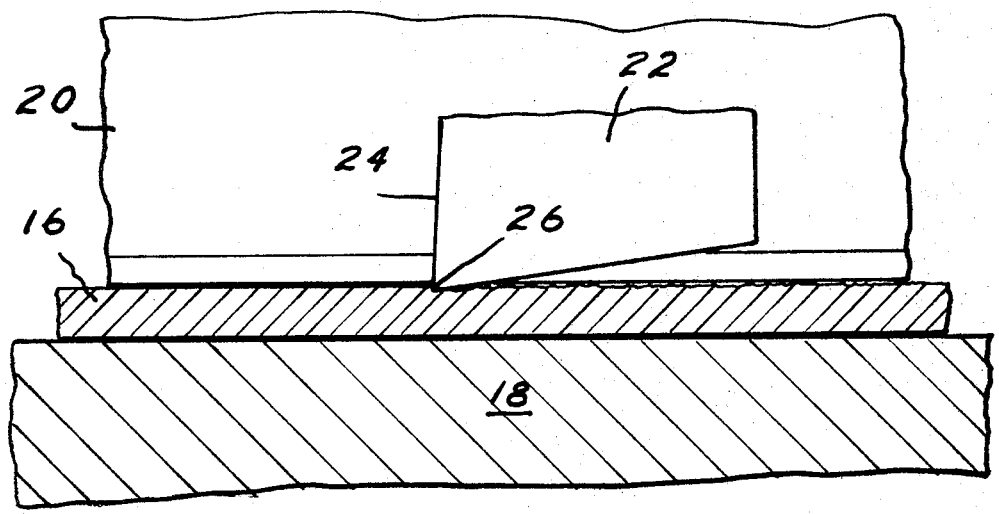
FIG. 3 is a side elevation partly in section illustrating the process by which a textured surface panel is produced in accordance with the present invention.
Figure 4:
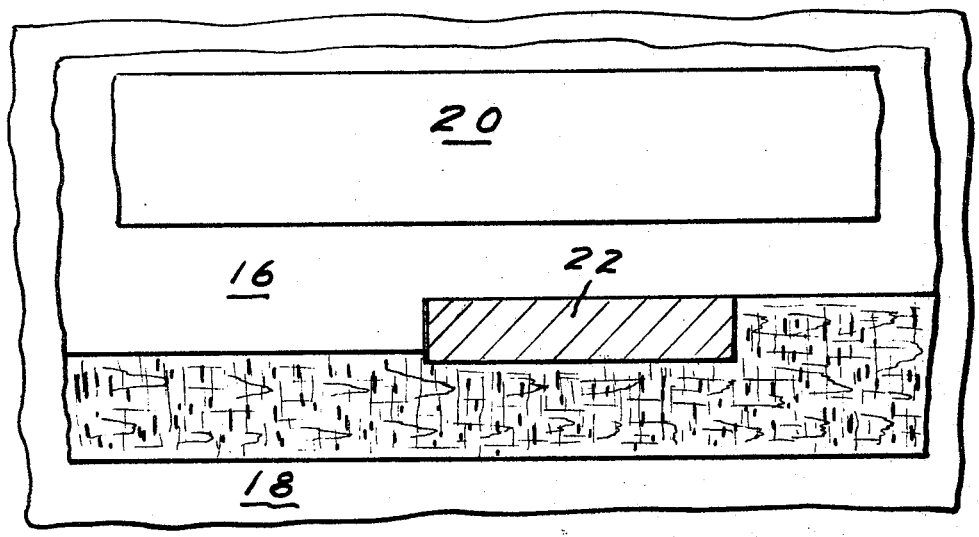
FIG. 4 is a top plan view illustrating the arrangement of parts shown in FIG. 3.

To produce a textured panel suitable for the purposes described, a plate of a suitable metal such as mild steel or aluminum having a thickness of, for example, ¼ inch, and having a surface area as large as desired, is used. Such a plate is illustrated in cross section at 16 in FIG. 3 and which is secured to the bed 18 of a planer mill by means of a relatively heavy I-beam 20 extending lengthwise of the bed and relatively closely adjacent the path of travel of the planer tool 22. The forward face 24 of the tool 22 is preferably substantially vertical relative to the surface of the plate 16 and the cutting edge 26 of the tool 22 is first uniformly sharpened across its entire length following which it is slightly dulled, such as by a relatively fine grit oilstone held in the hand and rubbed across the edge 26. The tool 22 is so adjusted so as to make a relatively deep cut in the upper surface of the plate 16, such as to a depth of .020 to .050 inch. I have found that a tool having a width of from two to three inches operates satisfactorily. A plurality of overlapping passes is then made by the tool 22 relative to the upper surface of the plate 16 so as to remove a layer of metal from the upper surface thereof. Due to the dullness of the cutting edge of the tool, and the substantially vertical relationship of the forward face of the cutting edge, the layer of metal rather than being smoothly cut from the upper surface of the plate 16 in accordance with conventional machining practice is more or less scraped or torn from the upper surface of the plate, leaving a rough, jagged and textured surface upon the upper side of the plate 16.

Figure 2:
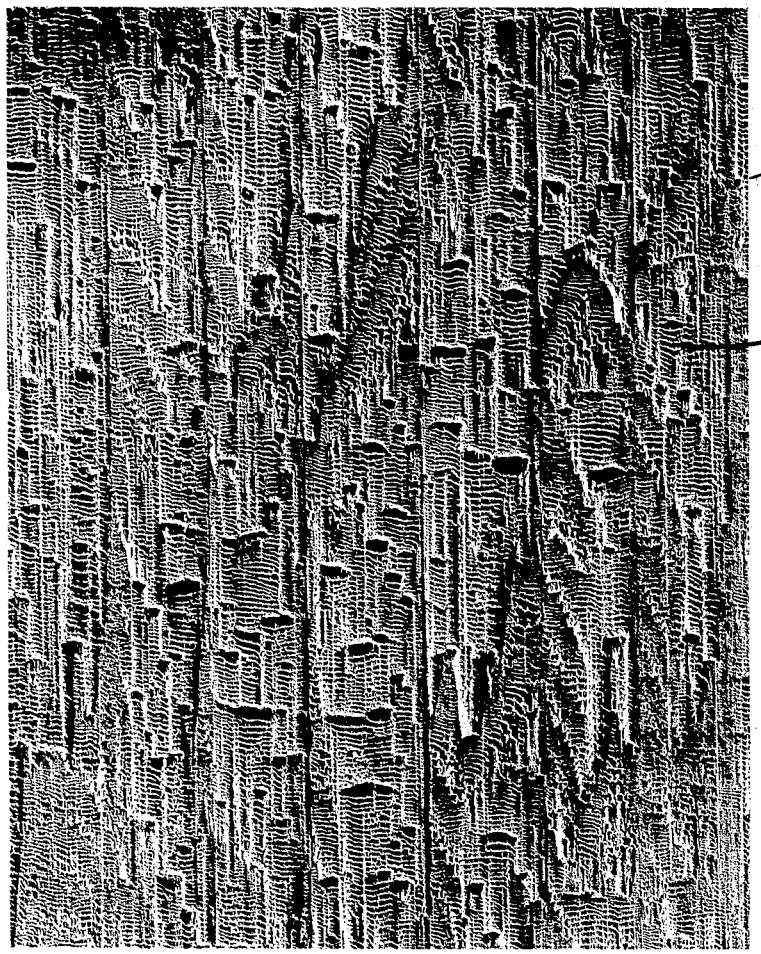
FIG. 2 is a photographic reproduction to an enlarged scale of a portion of the front surface of the panel as illustrated in FIG. 1.

The pattern will consist of alternating ridges and fissures which will be of random width and depth and thus irregular in all directions, as is evident from FIG. 2.

Considerable chattering will obviously occur between the tool and the workpiece, or plate 16, and it is obvious that care must be taken to rigidly secure the plate 16 against the bed 18 throughout its entire longitudinal extent. It is preferred to use a relatively heavy I-beam 20 to hold the plate 16 firmly against the bed 18. Moreover, the I-beam 20 should be arranged relatively close to the path of travel of the tool 22 and which, of course, will necessitate frequent readjustment of the I-beam 20 as the tool 22 moves progressively across the width of the plate by successive passes.

After a layer of metal has been scraped or torn from the entire upper surface of the plate 16, it is then ready for use in this form as a decorative structural member or as an embossing plate in the manufacture of decorative composite panels such as previously described. It has been found expedient to use the panel produced in accordance with the present invention as an embossing plate in lieu of caul plates which are used in accordance with conventional processes for making composite boards, as described in various ones of the above referred to U.S. Letters Patent.

What is claimed is:

1. The process for producing a textured surface panel comprising the steps of:
    fastening a metal plate onto the bed of a planer;
    slightly dulling the cutting edge of a relatively wide planer tool;
    adjusting the depth of cut of the tool relative to the upper surface of the plate so that the tool removes a layer of metal of the order of from .020 to .050 inch from the upper surface of the plate with a rough, tearing action; and
    making a series of overlapping passes with said tool across the plate producing a rough, jagged, textural surface upon the upper side of said plate.

2. The process as described in claim 1 in which the wide, planer tool is used having a width of the order of from two to three inches and is provided with a forward face which is substantially at right angles to the line of travel of the tool.

References Cited

UNITED STATES PATENTS

| | | | |
|---|---|---|---|
| 1,437,035 | 11/1922 | Anderson | 90—24 |
| 2,677,170 | 5/1954 | Kuns et al. | 29—95 |
| 3,335,638 | 8/1967 | Brunn | 90—11 |

GERALD A. DOST, Primary Examiner

U.S. Cl. X.R.

144—309, 320; 161—124, 164